United States Patent [19]
Watanabe et al.

[11] Patent Number: 5,587,990
[45] Date of Patent: Dec. 24, 1996

[54] OPTICAL DISC SYSTEM AND OPTICAL DISC THEREFOR

[75] Inventors: Tetsu Watanabe; Yoshio Aoki, both of Tokyo, Japan

[73] Assignee: Sony Corporation, Tokyo, Japan

[21] Appl. No.: 499,331

[22] Filed: Jul. 7, 1995

Related U.S. Application Data

[60] Continuation-in-part of Ser. No. 383,351, Feb. 3, 1995, Pat. No. 5,533,001, which is a division of Ser. No. 277,357, Jul. 19, 1994, Pat. No. 5,392,263, which is a continuation of Ser. No. 761,874, Sep. 13, 1991, abandoned.

[30] Foreign Application Priority Data

Jan. 31, 1990 [JP] Japan ....................... 2-21210

[51] Int. Cl.⁶ ....................................... G11B 7/24
[52] U.S. Cl. .................. 369/275.2; 369/13; 369/275.5
[58] Field of Search .................... 369/275.2, 13, 369/275.1, 275.5, 283, 281, 280, 110, 14; 300/59, 114; 365/122

[56] References Cited

U.S. PATENT DOCUMENTS

| | | | |
|---|---|---|---|
| 4,807,204 | 2/1989 | Mizutani et al. | 369/13 |
| 4,922,454 | 5/1990 | Taki | 369/13 |
| 4,926,403 | 5/1990 | Tsuyuguchi et al. | 369/13 |
| 5,197,049 | 3/1993 | Wehrenberg | 369/13 |
| 5,276,674 | 1/1994 | Tanaka | 369/275.5 |
| 5,287,334 | 2/1994 | Iwabuchi et al. | 369/13 |
| 5,479,382 | 12/1995 | Nishida et al. | 369/13 |
| 5,528,565 | 6/1996 | Watanabe et al. | 369/13 |

*Primary Examiner*—Tan Dinh
*Attorney, Agent, or Firm*—Jay H. Maioli

[57] ABSTRACT

An optical disc system using an optical disc with a light-transmitting cover and an objective lens for bundling or focusing a laser beam on a recording layer of the optical disc in order to perform recording and/or reproduction. The thickness $t_2$ of the light-transmitting cover is set to fall within the range of 0.6 to 0.1 mm, the numerical aperture (NA) of the objective lens is set to fall within the range of 0.55 to 0.70 and the wavelength of the light beam is selected to be between 635 and 650 nanometers.

4 Claims, 4 Drawing Sheets

OPTICAL DISC SYSTEM AND OPTICAL DISC THEREFOR

This application is a continuation in part of application Ser. No. 08/383,351 filed Feb. 3, 1995 and now is U.S. Pat. No. 5,533,001, which is a divisional of application Ser. No. 08/277,357 filed Jul. 19, 1994 and now is U.S. Pat. No. 5,392,263, which is a continuation of application Ser. No. 07/761,874 filed Sep. 13, 1991, now abandoned.

BACKGROUND OF THE INVENTION

1. Field of the Invention

The present invention relates to optical disc systems for performing recording and/or reproduction of an information signal, and optical discs used in these systems.

2. Description of the Prior Art

An optical disc system shown in FIG. 1 performs recording in and/or reproduction from an optical recording medium, such as an optical disc.

A conventional optical disc system shown in FIG. 1 is arranged such that a disc-like, one-sided optical recording medium 50 is mounted and an optical system including a laser unit 58, an objective lens 59, and the like is arranged above the one-sided optical recording medium 50. The numerical aperture, referred to as NA hereinafter, of the objective lens 59 is set to fall within the range of 0.50 to 0.53.

In order to drive the optical system in focusing and tracking directions with respect to the optical recording medium 50, a drive system (not shown) is provided.

The one-sided optical recording medium 50 is formed as follows. A reflecting and recording layer 55 and a protective cover film 56 are sequentially stacked on one surface of a light-transmitting transparent substrate 51 made of, for example, polycarbonate. The transparent substrate 51 has a predetermined thickness $t_1$. The thickness of a conventional substrate is set to be 1.2 mm.

An operation of the previously known disc system will be described below.

The one-sided optical recording medium 50 is placed on and driven by a rotary table (not shown). A laser beam emitted from the laser unit 58 is focused through the objective lens 59 onto the recording layer 55. A change in intensity of the focused laser beam in accordance with the data to be recorded produces pits in the reflective recording layer 55.

In order to cope with an increase in information volume, more information signals must be recorded in the recording layer of an optical disc, however, there are dimensional constraints on the optical disc and other constraints on the lens and light source that presently prevent such increases in information volume.

OBJECT AND SUMMARY OF THE INVENTION

It is, therefore, an object of the present invention to provide a large-capacity optical disc system capable of performing recording and/or reproduction with a higher density, and an optical disc used in this optical disc system.

According to an aspect of the present invention, there is provided an optical disc system for recording an information signal in an optical disc and/or reproducing the information signal from the optical disc, the optical disc being provided with a recording layer irradiated with a laser beam to perform recording or reproduction and a light-transmitting cover which is formed to cover the recording layer and through which the laser beam is transmitted, and the optical disc system comprising laser beam generating means for generating the laser beam having a wavelength between 635 and 650 nm and an objective lens for bundling or focusing the laser beam on the recording layer through the light-transmitting cover, characterized in that a thickness of the light-transmitting cover of the optical disc falls within a range of 0.6 to 0.1 mm, and a numerical aperture of the objective lens falls within a range of 0.55 to 0.70.

When the laser beam is bundled or focused by the objective lens, the convergent rays have a minimum diameter ($2\omega_0$) represented by equation (1) below:

$$2\omega_0 = 0.82 \times \lambda/NA \tag{1}$$

($\lambda$: wavelength of the laser beam)

Since the numerical aperture NA of the objective lens is larger than a value falling within the conventional NA range of 0.50 to 0.53, the minimum diameter of the convergent rays is decreased, so that the recording density is increased. Therefore, reproduction corresponding to this light recording density can be performed.

As the NA is increased, the thickness of the objective lens is increased, but the thickness of the light-transmitting cover of the optical disc according to the present invention is made smaller than the conventional thickness (1.2 mm), so that the objective lens having a larger thickness will not be brought into contact with the optical disc during focussing, for example.

As the NA of the objective lens and the thickness t of the light-transmitting cover of the optical disc are changed, the aberration values of the objective lens are changed as follows.

(A) Spherical Aberration $W_{40}$ (2)

$$W_{40} = \frac{t}{8} \cdot \frac{N^2-1}{N^3} \sin^4\alpha$$

($\sin \alpha = NA$)
(N: refractive index of light-transmitting cover of the optical disc)

(B) Coma $W_{31}$ (3)

$$W_{31} = \frac{t}{2} \cdot \frac{(N^2-1)N^2\sin\theta\cos\theta}{(N^2-\sin^2\theta)^{5/2}} \sin^3\alpha$$

($\theta$: skew)

The spherical aberration (A) can be corrected by the objective lens and does not pose any decisive problem. If the thickness t of the light-transmitting cover is, however, dispersive, problems may be presented. Therefore, the thickness t is preferably set to fall within the tolerance described above.

The coma (B) cannot be corrected by the objective lens. It is preferable to make the absolute value of the coma as small as possible. Even if the numerical aperture NA increases, the thickness t of the light-transmitting cover becomes small, so that the absolute value of the coma $W_{31}$ does not become large.

Each aberration of the objective lens scarcely poses any problem even when the numerical aperture NA is increased. According to the optical disc system described above, recording and/or reproduction can thus be performed in higher density than that of a conventional system.

In the system using the optical disc of the invention, the numerical aperture NA of the objective lens for performing high-density recording or reproduction falls within the range of 0.55 to 0.70, so that the thickness of the light-transmitting cover of the disk, formed to cover the recording layer and transmit the laser beam to the recording layer, is set to fall within the range of 0.6 to 0.1 mm accordingly.

Thus, an optical recording media capable of performing high-density recording and reproduction can be realized.

The optical disc may have respective recording layers on both sides of the substrate. Such optical disc having the respective recording layers on both sides can be used in an optical disc system of this invention. In this system, a pair of optical pickup units, each of which has a laser beam generating means, and an objective lens are arranged on opposite sides of an optical disc so as to face each other.

According to the optical disc having the recording layers on its both surfaces, and the optical disc system capable of using this disc, higher-capacity recording and reproduction can be performed.

DETAILED DESCRIPTION OF PREFERRED EMBODIMENTS

First, second, and third embodiments of this invention will be described with reference to FIGS. 2 to 4.

Figure 2:
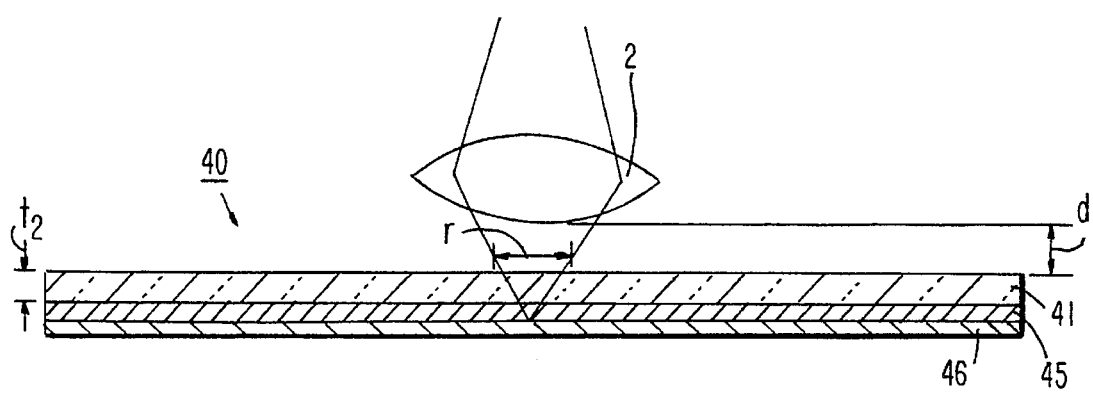
FIG. 2 is a sectional view showing an arrangement of an optical disc system according to a first embodiment of the present invention.

FIG. 2 is a sectional view showing the first embodiment in which the present invention is applied to an optical disc system, and FIG. 2 shows the basic arrangement of this system.

Figure 1:
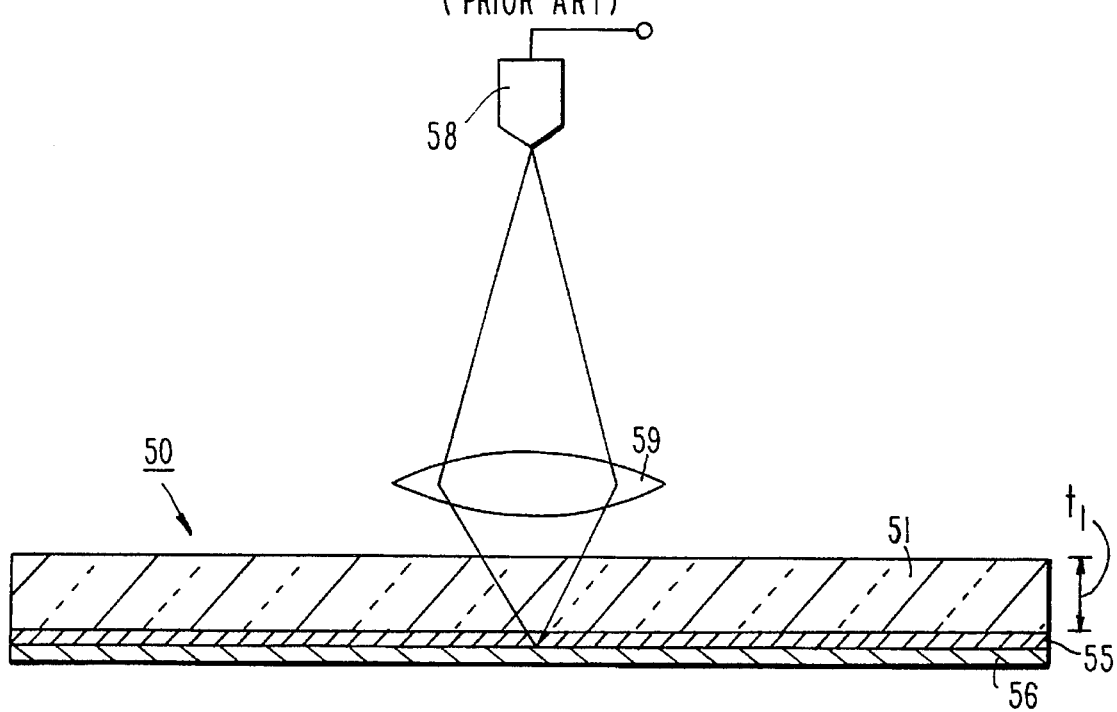
FIG. 1 is a sectional view showing a basic arrangement of a conventional optical disc system.

As shown in FIG. 2, this optical disc system comprises an objective lens 2 having an NA of 0.55 to 0.70. This optical disc system is arranged to perform recording and reproduction upon radiating a laser beam of the laser beam unit to a disc-like one-sided optical recording medium 40, which is obtained by sequentially stacking a reflecting recording film 45 and a protective cover film 46 on a thin light-transmitting substrate 41 having thickness $t^2$ of 0.1 to 0.6 mm, which is smaller than that of the conventional substrate shown in FIG. 1.

The objective lens 2 serving as an optical system is bonded and fixed to a bobbin (not shown) to be an integrated structure.

In an optical recording medium used in this optical disc system, for example, a 3.5" optical disc is preferably used as a disc and because of the thinness of the substrate is preferably housed in a cartridge.

When the NA of the objective lens 2 is increased to fall within the range of 0.55 to 0.70, its focal depth (=λ/NA$^2$, λ: wavelength of laser beam) becomes small. Once the optical disc is made small as described above, an actuator (not shown) constituting a drive system for the optical pickup can be made small, and its frequency and servo response characteristics can be improved. As this actuator can properly perform tracking control of the optical pickup, it raises no problem that the focal depth is small.

The spherical aberration $W_{40}$ is corrected by the objective lens 2. As for the coma $W_{31}$, even if the NA of the objective lens is increased as described above, it raises no problem, because the thickness $t_2$ of the light-transmitting substrate is very small.

Numerical apertures NA and thicknesses t at the time of the coma $W_{31}$ being equivalent to the coma $W_{31}$ at the time when NA of the objective lens is 0.5 and the thickness t of the light-transmitting substrate (light-transmitting cover) is 1.2 mm are obtained in the following three cases.

TABLE 1

| NA | 0.5 | 0.6 | 0.6 |
|---|---|---|---|
| λ (nm) | 780 | 635 | 650 |
| t (mm) | 1.2 | 0.565 | 0.578 |

As shown in Table 1, if the thickness t is set to fall within the range of 0.6 to 0.1 mm even when the NA range is 0.55 to 0.70, the coma can be suppressed to a level equal to or lower than that of the conventional case, so that no problem arises.

As the NA of the objective lens 2 is increased, the thickness of the objective lens 2 is increased. However, since the thickness $t_2$ of the transparent substrate is small, a distance d (working distance) between the objective lens 2 and the optical recording medium 40 increases more than predetermined value as shown in FIG. 2. The objective lens 2 is not brought into contact with the optical recording medium 40.

The present invention is based on the relationship between a numerical aperture (NA) of an objective lens, the wavelength (λ) of a light beam radiated from a light source, and the thickness (t) of a light-transmitting cover layer. The results of the relationship are shown in Table 1 and with these values coma can be suppressed to a level equal to or lower than that of the conventional case shown in FIG. 1 with a cover layer thickness of 1.2 mm.

Equation (3) above was used to determine the acceptable coma level according to a skew margin for the 3.5 inch magneto-optical disc, which is standardized by the International Standards Organization (ISO). The skew margin is closely related to the coma, because if the skew of the disc is larger, the coma is larger. In other words, if the surface of the disc being irradiated by the light beam is inclined relative to the optical axis of that light beam, the spot on the recording layer is not a circle but is elongated like a comet. As a result of such a non-circular spot, the data recorded on the disc can not be read out and data can not be correctly recorded on the disc.

Dust as a perplexing problem to an optical disc system can be eliminated when a cartridge is employed to house the recording medium.

The grain size and distribution of the dust are important factors to consider in the performance of the optical disc system. A radius r, as shown in FIG. 2, of a circle formed when a laser beam is projected on the transparent substrate 41 is given as follows:

$$r = t \cdot \tan(\arc \sin(NA/N)) \qquad (4)$$

As is apparent from equation (4), when the thickness t of the light-transmitting cover is decreased, the radius r is also reduced. But the NA is large, so that the radius r cannot be greatly decreased. Therefore, no dust problem is posed in this embodiment of the present invention.

As described above, in the optical disc system of this embodiment the NA of the objective lens is set to fall within the range of 0.55 to 0.70 and preferably with a value of 0.6 and, at the same time, the thickness $t_2$ of the light-transmitting substrate (light-transmitting cover) is set to fall within the range of 0.6 to 0.1 mm, so that the recording density can be increased $(0.55/0.50)^2$ to $(0.70/0.50)^2$ times, or nearly 1.2 to 2 times greater than that of the conventional system, in which an objective lens having an NA of 0.50 is used, as is apparent from equation (1). All the above-mentioned various problems caused by an increase of NA can thus be overcome. Therefore, a large storage capacity optical disc system can be obtained without posing any problem.

Detailed arrangements of the optical disc system given in the first embodiment will be further given in the second and third embodiments.

Figure 3:
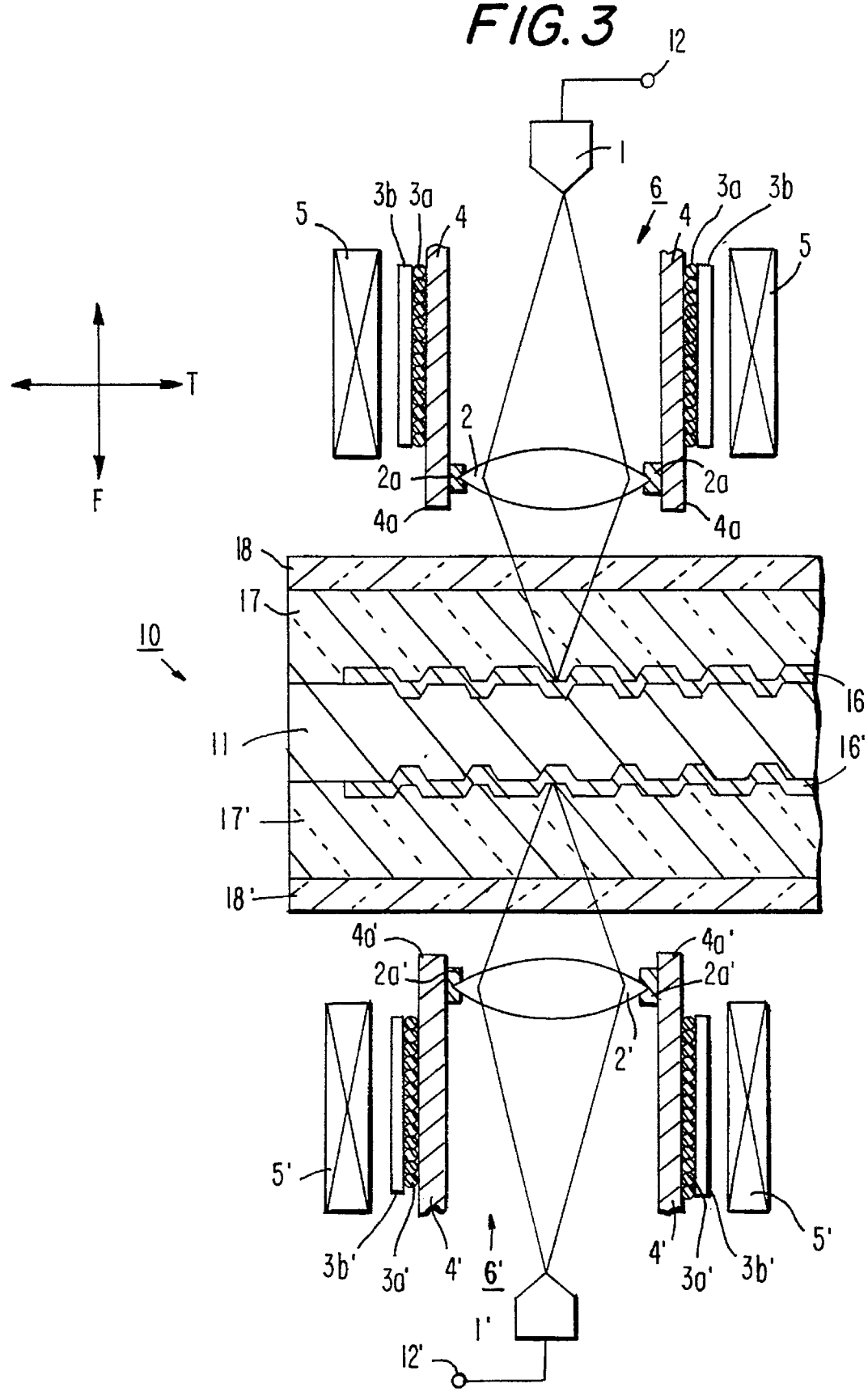
FIG. 3 is a sectional view showing an arrangement of an optical disc system according to a second embodiment of the present invention.
Figure 4:
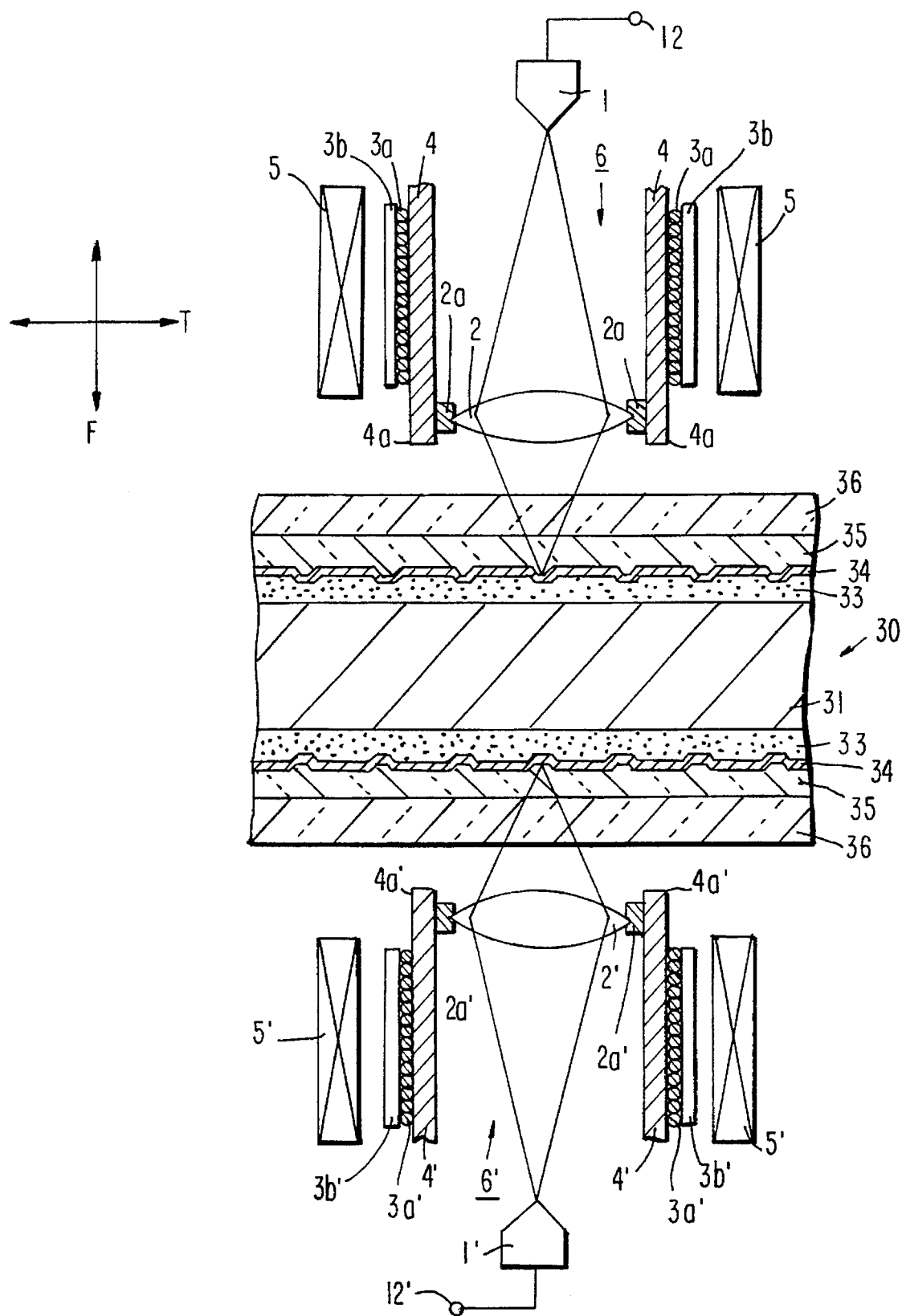
FIG. 4 is a sectional view showing the optical disc system according to a third embodiment of the present invention.

FIG. 3 is a sectional view of an optical disc system according to the second embodiment of the present invention.

In the second embodiment, first and second optical pickup units are arranged on opposite sides of a optical recording medium 10 so as to face each other as shown in FIG. 3.

The first optical pickup unit located above the optical recording medium 10 and the second optical pickup unit located below the optical recording medium 10 are substantially the same as described below, and thus, reference numeral 1 corresponds to reference numeral 1'.

Each of the first and second optical pickup units of FIG. 3 comprises a pickup that is an optical system and has a laser unit 1, 1', an objective lens 2, 2' having an NA of 0.55 to 0.70 (preferably 0.6), a bobbin 4, 4' on which a focus coil 3a, 3a' and a tracking coil 3b, 3b' are wound, and a magnet 5, 5' which surrounds the bobbin 4, 4'.

The bobbin 4, 4' of the pickup 6, 6' is of cylindrical shape, and on the bobbin 4, 4' are wound the focus coil 3a, 3a' for driving the pickup 6, 6' in the directions of a double-headed arrow F in FIG. 3, and the tracking coil 3b, 3b' for driving the pickup 6, 6' in the directions of a double-headed arrow T in FIG. 3. Lens support members 2a and 2a' are arranged adjacent to end portions 4a and 4b' of the coil bobbins 4 and 4', respectively. The objective lenses 2 and 2' for focusing the laser beams emitted from the laser units 1 and 1', are supported by the lens support members 2a and 2a', respectively.

In the two-sided optical recording medium 10 shown in FIG. 3 recording portions 16, photo-curable resin layers 17, and transparent protective plates or cover layers 18 are formed respectively on both surfaces of a single substrate 11. Both the transparent protective plates or cover layers 18 and the photo-curable resin layers 17 have light-transmitting properties and a total thickness thereof can be less than 0.6 mm.

In this double-sided optical recording medium 10, the substrate 11 is used in common, so that the thickness of the recording medium can be made substantially half as compared with that of a conventional double-sided optical recording medium, in which the two substrates are stuck together.

The functioning of the disc system of FIG. 3 will be described below.

In the first optical pickup unit, as a current is supplied to the focus coil 3a, the coil bobbin 4 is driven to displace the unit along the optical axis of the objective lens 2, that is, in a direction of arrow F in FIG. 3. When a current is supplied to the tracking coil 3b, the coil bobbin 4 is driven to displace in a direction perpendicular to the optical axis of the objective lens 2, which is indicated by arrow T in FIG. 3.

Similarly, the second optical pickup unit is driven to displace itself in the directions of arrows F and T synchronously with the displacement of the first optical pickup unit.

The laser beams emitted from the laser units 1 and 1' are focused on the areas of the recording layers 16 and 16' through the objective lenses 2 and 2'. The signals to be recorded by the lasers 1 and 1' are fed in at terminals 12 and 12', respectively.

Accordingly to the second embodiment, recording in or reproduction from the double-sided optical recording medium 10 can be variously performed. For example, if the laser units 1 and 1' are simultaneously used, simultaneous recordings in the respective upper and lower surfaces of the double-sided optical recording medium 10 can be performed. Similarly, when both the laser units 1 and 1' are simultaneously used, simultaneous reproduction can be performed. A large storage capacity recording medium can be obtained, and high-speed recording and reproduction of information signals can be performed. The photo-detector and beam splitter used in the reproduction mode are not shown because they are conventional and form no part of this invention.

After recording in or reproduction from one surface of the double-sided optical recording medium 10 is performed, recording in or reproduction from the other surface can be performed. The capacity of recording and reproduction can be doubled as compared with that of a one-sided optical recording medium.

The third embodiment will be described below. In this embodiment, the same optical disc system illustrated in FIG. 3 is used, as shown in FIG. 4, but recording and reproduction can be performed on a second double-sided optical recording medium 30.

In this second double-sided optical recording medium 30, a photo-curable resin layer 33, an optical recording layer 34, an adhesive layer 35, and a transparent protective plate or cover layer 36 are sequentially stacked on each of the surfaces of a single substrate 31. Both the transparent protective plate or cover layer 36 and the adhesive layer 35 have light-transmitting properties, and a total thickness thereof is less than 0.6 mm.

In the third embodiment, recording in or reproduction from both surfaces of the double-sided optical recording medium 30 can be simultaneously performed. Further, as recording in or reproduction from one surface is performed, recording in or reproduction from the other surface can be performed.

As described above, in the second and third embodiments the numerical aperture NA of the objective lens 2, 2' is increased as in the first embodiment, so that high-density recording and reproduction are possible. At the same time, the double-sided optical recording medium can be used, so that high storage capacity, higher-speed recording and reproduction are possible. Thus, a large storage capacity optical disc system can be provided.

The optical disc system has been described in relation to an optical disc system, in which recording and/or reproduction are performed on an optical disc, an optical recording medium (including a "write-once" type optical recording medium for example) that has pits in a recording layer.

According to the optical disc system of the present invention, the NA of the objective lens for focusing the laser beam is increased, and the thickness of the light-transmitting cover of the optical disc is decreased, so that recording and/or reproduction can be performed in higher density, and large-capacity recording can be realized.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. An optical recording medium used in an optical recording and/or reproducing apparatus having at least one light source for radiating a light beam and at least one objective lens for converging the light bream on an optical axis thereof, the wavelength of the light beam radiated from the light source falling within a range of 635 to 650 nm, the numerical aperture of the objective lens being 0.6, said medium comprising:

a recording layer; and a light-transmitting cover layer provided on the one surface of said recording layer and transmitting the light bream to irradiate on said recording layer, wherein the thickness of the light transmitting cover layer falls within a range of 0.55 to 0.6 mm.

2. An optical disc system for recording and/or reproducing information signals comprising:

at least one light source for radiating at least one light beam;

an optical disc including a recording layer, and a light-transmitting cover layer provided on the one surface of said recording layer and transmitting the light beam to irradiate on said recording layer; and at least one objective lens for converging the light beam on said recording layer through said light-transmitting cover layer, wherein said optical disc system is characterized in that the wavelength of the light beam from said light source falls within a range of 635 to 650 nm, the thickness of said light-transmitting cover layer falls within a range of 0.55 to 0.6 mm, and the numerical aperture of said objective lens is 0.6.

3. An optical recording and/or producing apparatus used as an optical recording medium having a first recording layer, a first light-transmitting cover layer provided on one side surface of said first recording layer, a second recording layer provided to be parallel to said first recording layer, and a second light-transmitting cover layer provided on one side surface of said second recording layer, each thickness of said first and second light-transmitting cover layers falls within a range of 0.55 to 0.6 mm, said apparatus comprising:

a light source for generating a light beam; and an objective lens for converging the light beam radiated from said light source on one of the first and second recording layers and arranged to oppose one of the first and second light transmitting cover layers, wherein the numerical aperture of said objective lens is 0.6 and a wavelength of the light beam radiated from said light source falls within a range of 635 to 650 nm.

4. An optical recording and/or reproducing apparatus according to claim 3, wherein said apparatus further comprises a second light source for generating a light beam and a second objective lens for focusing the light beam radiated from said second light source on one of the first and second recording layers and arranged to oppose one of the first and second light transmitting cover layers, said second objective lens being arranged at an opposite side of the optical recording medium to the first objective lens, wherein the numerical aperture of said second objective lens is 0.6 and a wavelength of the light beam radiated from said second light source falls within a range of 635 to 650 nm.

* * * * *